United States Patent
Flores, Jr. et al.

(10) Patent No.: US 6,454,090 B1
(45) Date of Patent: Sep. 24, 2002

(54) DISC STORAGE CONTAINER (75) Inventors: Victorio T. Flores, Jr., Rancho Palos Verdes; Victorio M. Flores, III, San Pedro; Ernst C. Benjamins, Covina, all of CA (US)

(73) Assignee: Filam National Plastics, Gardena, CA (US)

( * ) Notice: Subject to any disclaimer, the term of this patent is extended or adjusted under 35 U.S.C. 154(b) by 0 days.

(21) Appl. No.: 09/573,867

(22) Filed: May 18, 2000

(51) Int. Cl.[7] .............................................. B65D 85/57
(52) U.S. Cl. ................................... 206/308.1
(58) Field of Search ............................ 206/308.1, 310, 206/493, 309, 312

(56) References Cited

U.S. PATENT DOCUMENTS

| | | |
|---|---|---|
| 3,949,872 A | 4/1976 | Paudras |
| 4,685,277 A | 8/1987 | Ilsemann |
| 4,722,439 A | 2/1988 | Grobecker et al. |
| 4,747,484 A | 5/1988 | Ackeret |
| 4,771,883 A | 9/1988 | Herr et al. |
| 4,771,890 A | 9/1988 | Hofland et al. |
| 4,899,875 A | 2/1990 | Herr et al. |
| 4,964,510 A | 10/1990 | Loyd |
| 5,205,401 A | 4/1993 | Weisburn et al. |
| 5,211,283 A | 5/1993 | Weisburn et al. |
| 5,259,498 A | 11/1993 | Weisburn et al. |
| 5,279,097 A | 1/1994 | Weisburn et al. |
| 5,284,243 A | 2/1994 | Gelardi et al. |
| 5,390,515 A | 2/1995 | Essick |
| 5,445,265 A | 8/1995 | Herr et al. |
| D369,712 S | 5/1996 | Sankey et al. |
| 5,533,615 A | 7/1996 | McCamy |
| 5,551,560 A | 9/1996 | Weisburn et al. |
| 5,573,120 A | 11/1996 | Kaufman et al. |
| 5,574,716 A | 11/1996 | Uchida |
| 5,584,391 A | 12/1996 | Weisburn |
| 5,590,768 A | 1/1997 | Hilton et al. |
| 5,597,068 A | 1/1997 | Weisburn et al. |
| 5,615,779 A | 4/1997 | Marsilio et al. |
| 5,682,991 A | 11/1997 | Lammerant et al. |
| 5,690,218 A | 11/1997 | McCamy et al. |
| D387,217 S | 12/1997 | Lakoski et al. |
| 5,713,463 A | 2/1998 | Lakoski et al. |
| 5,762,187 A | 6/1998 | Belden, Jr. et al. |
| 5,779,038 A | 7/1998 | Herr et al. |
| 5,782,350 A | 7/1998 | Weisburn et al. |
| 5,788,068 A | 8/1998 | Fraser et al. |
| 5,794,796 A | 8/1998 | Weisburn |
| 5,816,394 A | 10/1998 | O'Brien et al. |
| 5,829,582 A | 11/1998 | Ippolito et al. |
| 5,829,583 A | 11/1998 | VerWeyst et al. |
| 5,842,563 A | 12/1998 | Herr et al. |
| 5,938,020 A | 8/1999 | Luckow |
| 6,155,417 A | 12/2000 | Flores, Jr. et al. |
| 6,164,446 A | 12/2000 | Law |

FOREIGN PATENT DOCUMENTS

| | | |
|---|---|---|
| WO | WO96/14636 | 5/1996 |
| WO | WO97/41563 | 11/1997 |

*Primary Examiner*—Bryon P. Gehman
(74) *Attorney, Agent, or Firm*—Christie, Parker & Hale, LLP (57) ABSTRACT

A storage container for storing optical discs, the storage container having a support ring that defines a disc storage area and a plurality of holding members that securely retain a disc in the disc storage area, each holding member having a base connected to the disc storage area and a disc supporting wall having a retaining lip that limits the movement of the disc when the disc is placed in the disc storage area. The holding member being flexible so as to facilitate the insertion and removal of a disc from the disc storage area. In another embodiment of the invention, the storage container further includes a pair of release buttons placed diametrically opposed to one another to facilitate the removal of a disc from the disc container.

16 Claims, 10 Drawing Sheets

DISC STORAGE CONTAINER

FIELD OF THE INVENTION

The present invention relates generally to disc storage containers and more particularly, to a disc storage container which is configured to store an optical disc such as a CD, CD-ROM, CD-R, CD-RW, DVD, DVD-R, DVD-RAM or the like.

BACKGROUND OF THE INVENTION

Optical discs such as CDs, CD-ROMs, CD-Rs, CD-RWs, DVDs, DVD-Rs, DVD-RAMs and the like are well known. Such optical discs are commonly stored within a protective container. The protective container prevents the optical disc from being scratched or otherwise damaged during shipping, handling and storage thereof.

As those skilled in the art will appreciate, optical discs are subject to being damaged by mishandling thereof. Although the bottom surface of such optical discs comprises a layer of polycarbonate or the like which has a thickness of approximately 0.050 inch (and which is thus comparatively durable and resistant to physical damage), the top surface of such optical discs comprises an extremely delicate aluminum film which typically has a thickness of only approximately 1 micron.

The delicate aluminum surface on the top of contemporary optical discs is therefore undesirably susceptible to physical damage. Scratching or other damage to this thin aluminum film often results in damage to the data, e.g., computer program, computer data, audio data, video data or the like stored upon the optical disc. Although data is typically stored upon such optical discs in a manner which readily facilitates recovery of lost portions thereof due to such physical damage to the media, it is still possible to damage the aluminum film such that data is permanently lost. It is even possible to damage the optical disc sufficiently that it becomes completely unusable. Thus, protective storage containers are frequently utilized to facilitate shipping, handling and storage of such optical discs. The storage containers protect the optical discs from physical damage which might otherwise occur.

Although such contemporary storage containers for optical discs and the like have proven generally suitable for their intended use, contemporary storage containers suffer from inherent deficiencies which detract from their overall effectiveness and desirability. For example, contemporary storage containers require that an optical disc be removed therefrom by pulling the optical disc upwardly at the periphery thereof, while pushing downwardly upon a central attaching hub of the storage container, so as to free the optical disc from the hub. Such pulling up at the periphery of the optical disc causes the optical disc to deform or bend substantially, thereby introducing substantial stresses into the optical disc.

The introduction of such stresses is particularly undesirable for multi-layer optical discs, such as those used in the production of high density DVDs and the like. Multi-layer optical discs are rapidly becoming popular because of the ability to store large amounts of data, such as video programming thereon.

As those skilled in the art will appreciate, the introduction of such undesirable stresses into multi-layer discs may cause the plural layers of the disc to delaminate as the shear strength of the bonding agent used to attach adjacent layers to one another is exceeded. Such delamination will, of course, result in the destruction of the disc, rendering it completely useless.

Thus, it is desirable to provide a storage container which is configured to store an optical disc, such as a CD, CD-ROM, CD-R, CD-RW, DVD, DVD-R, DVD-RAM or the like, which mitigates the undesirable introduction of stresses into the optical disc when it is placed within the storage container (both during an initial machine placement of the optical disc within the storage container and during subsequent user placement of the optical disc therein) and when the optical disc is removed from the storage container.

It is further desirable that the storage container facilitate automated or machine based manufacturing techniques, wherein a machine arm, pusher or the like is used to place an optical disc within the storage container in a rapid and efficient manner.

Another disadvantage of contemporary storage containers is that the containers have a bulky shape and as a number of storage containers are accumulated, a large space is needed for housing them. Accordingly, it is desirable that the storage container have a compact shape and design in order to minimize the space needed for storing multiple containers.

SUMMARY OF THE INVENTION

In one embodiment, the disc storage container of the present invention includes a tray having a disc storage area formed therein. The disc storage area is dimensioned to receive and store a disc when the center of the disc is aligned with the center of the disc storage area. A centering post is preferably located at the center of the disc storage area and dimensioned to fit snugly into the hole in an optical disc, thereby centering the disc in the disc storage area.

The disc is secured in the disc storage area by a plurality of holding members. Each holding member is positioned in a respective hole or opening in the tray of the disc storage compartment and is attached to the disc storage area by an arm thereof. The holding member is configured to bend outwardly to facilitate the insertion of a disc into the disc storage area or the removal of the disc therefrom. The holding member has a disc supporting wall laterally extending from the arm of the holding member. A lip is provided on the disc supporting wall to inhibit the movement of a disc when the disc is installed in the disc storage area. In a preferred embodiment, the holding members are arranged to maximize the stability for holding the disc in the disc storage area. Four holding members are preferably provided on the tray, the first and third holding members positioned diametrically opposed to each other and the second and fourth holding members diametrically opposed to each other. The distance between the first and second holding members is preferably greater than the distance between the third and fourth holding members.

The tray of the disc storage container preferably has recesses formed therein to facilitate the removal of the disc from the disc storage area. The recesses are dimensioned to allow a portion of a finger, e.g., a tip, to access the disc and assist in removing the disc from the disc storage container. In the preferred embodiment, the recesses are semi-circular in shape. Preferably there are four recesses, each one positioned proximate a respective holding member. The first and third recess are preferably diametrically opposed to each other and the second and fourth recess are diametrically opposed to each other. Moreover, the distance between the first and second recesses is greater than the distance between the second and third recesses.

In another embodiment of the present invention, the disc storage container includes a lower housing section connected to an upper housing section via a hinge panel. A support ring is provided on the lower housing section defining a disc storage area. The support ring preferably comprises four partial quadrants, each partial quadrant separated from an adjacent partial quadrant by a hole in the lower housing section. A pair of release buttons are disposed in a respective hole in the lower housing section. Each release button having a base attached to the floor of the disc storage area and configured to move outwardly with respect to the disc storage area to facilitate the insertion or removal of a disc. The release button further including a disc supporting wall with a retaining lip thereon, configured to inhibit the movement of a disc seated in the disc storage area. The release button preferably has an upper surface, the depression of which releases the grasp of the retaining lip and facilitates the removal of the disc from the disc storage area.

The disc storage container further includes a pair of holding members disposed in the remaining holes of the lower housing section. Each holding member attached to the floor of te disc storage area via a pair of extending arm and configured to bend outwardly when a disc is installed in or removed from the disc storage area. The holding members each having a retaining lip that is dimension to inhibit the movement of the disc when the disc is seated in the disc storage area.

BRIEF DESCRIPTION OF THE DRAWINGS

These and other features, aspects, and advantages of the present invention will be more fully understood when considered with respect to the following detailed description, appended claims, and accompanying drawings, wherein:

DETAILED DESCRIPTION OF THE INVENTION

The detailed description set forth below in connection with the appended drawings is intended as a description of exemplary embodiments of the invention and is not intended to represent the only form in which the present invention may be constructed or utilized. The detailed description sets forth the construction and functions of the invention, as well as the sequence of steps for operating the invention in connection with the illustrated embodiments. It is to be understood, however, that the same or equivalent functions may be accomplished by different embodiments which are also intended to be encompassed within the spirit and scope of the invention.

As used herein, the term "disc" is defined to include any compact disc (CD), compact disc read only memory (CD-ROM), recordable compact disc (CD-R), rewriteable compact disc (CD-RW), digital video disc or digital versatile disc (DVD), recordable digital video disc or digital versatile disc (DVD-R), digital video disc random access memory or digital virtual disc random access memory (DVD-RAM), as well as any other similar device which is used for storing information.

Referring now to FIGS. 1 through 5, according to a preferred embodiment of the present invention, the disc storage container 10 comprises a tray 12, having a disc storage area 14 formed therein. The disc storage container is preferably injection molded as an integrally formed unit, preferably of a transparent or clear polymer material, such as polypropylene or polystyrene or the like. The disc storage area 14 is preferably circular and is supported at its circumference, at least in part, by a supporting wall 16. A centering post 18 is provided at the center 20 of the floor 22 of the disc storage area 14. The centering post 18 is dimensioned to fit inside the center hole of an optical disc and to center the optical disc in the disc storage area 14 when the disc is placed therein.

Figure 2:
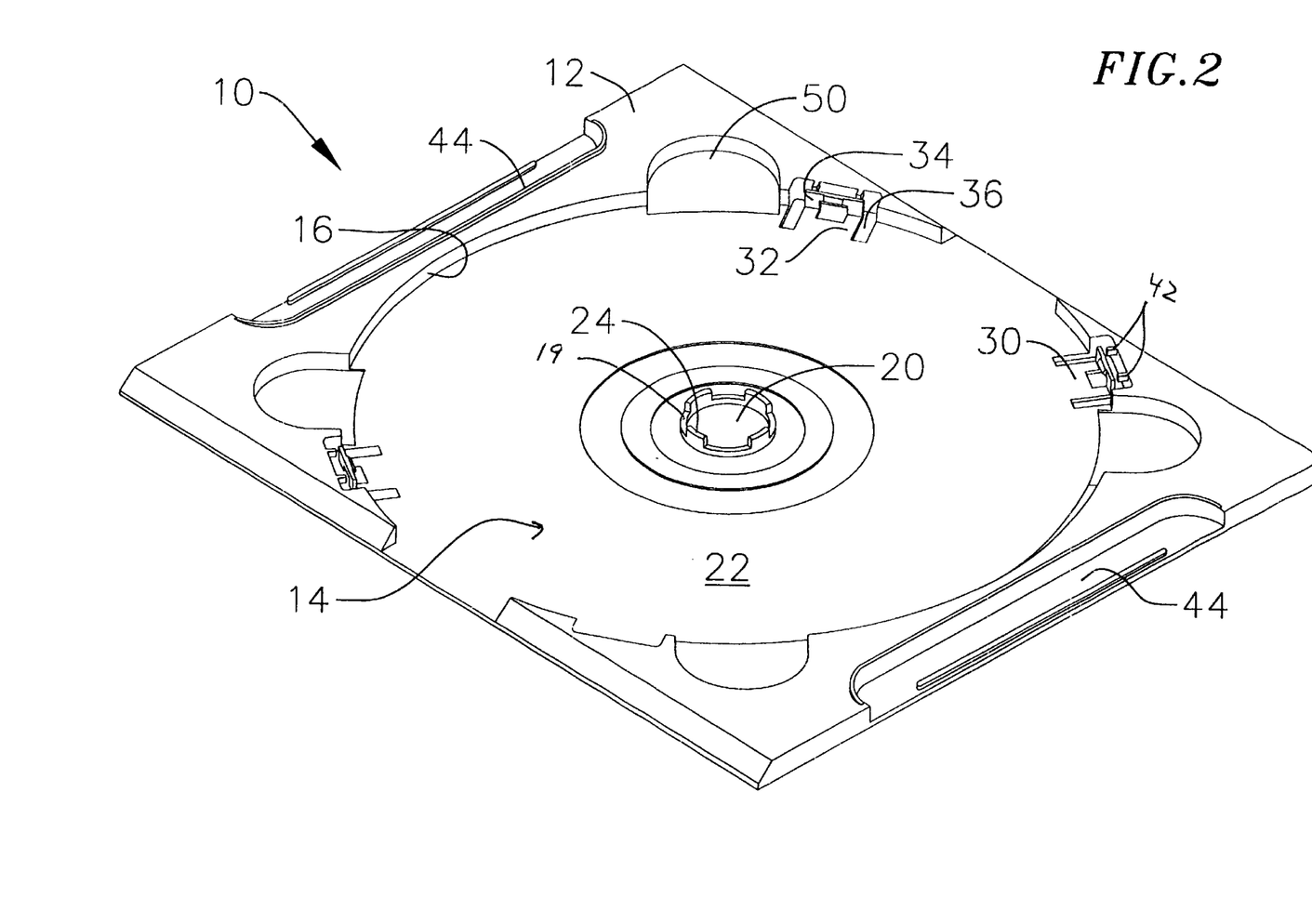
FIG. 2 is a perspective view of the disc storage container of FIG. 1.
Figure 3:
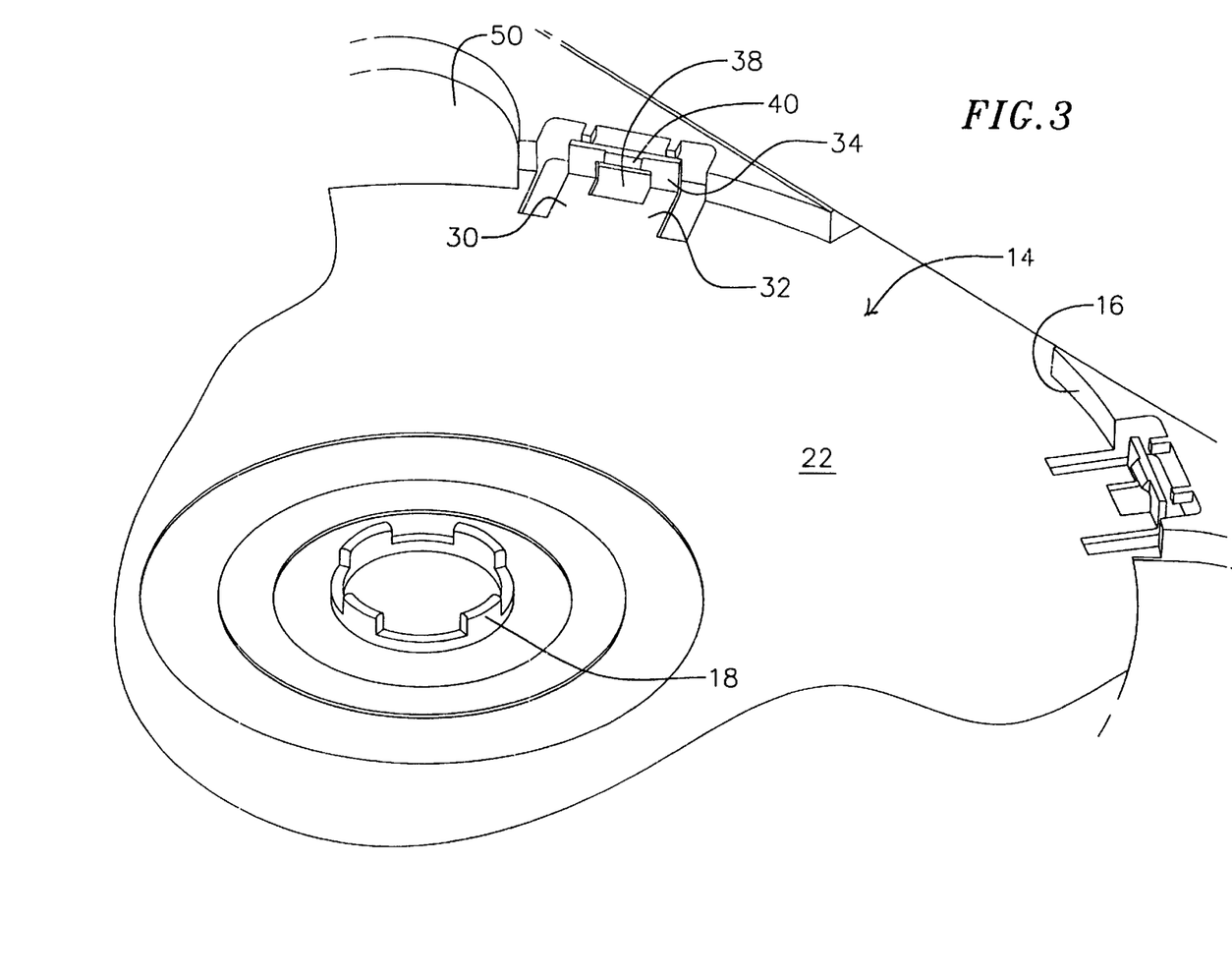
FIG. 3 is an enlarged fragmentary view of the holding member of the disc storage container of FIG. 1.

In a preferred embodiment, as shown in FIGS. 2 and 3, the centering post 18 comprises a ring 19 and four equally radially spaced apart panels 24 extending upward from ring 19. The panels 24 are positioned circumferentially so as to fit inside a center hole of a disc. In a preferred embodiment, the center hole of the disc fits snugly on the centering post 18 of the disc storage area 14. The panels 24 are spaced apart so as to allow easy access for the index finger of a user to engage the center hole of a disc when the disc is installed on the centering post 18. The gap between the panels 24 allows a user to contact the circumference of the center hole of a disc, when the disc is installed on the centering post 18. When the index finger contacts the circumference of the center hole of the disc, the index finger can be used to exert an upward force on the disc, thus facilitating the removal of the disc from the disc storage area 14.

Figure 1:
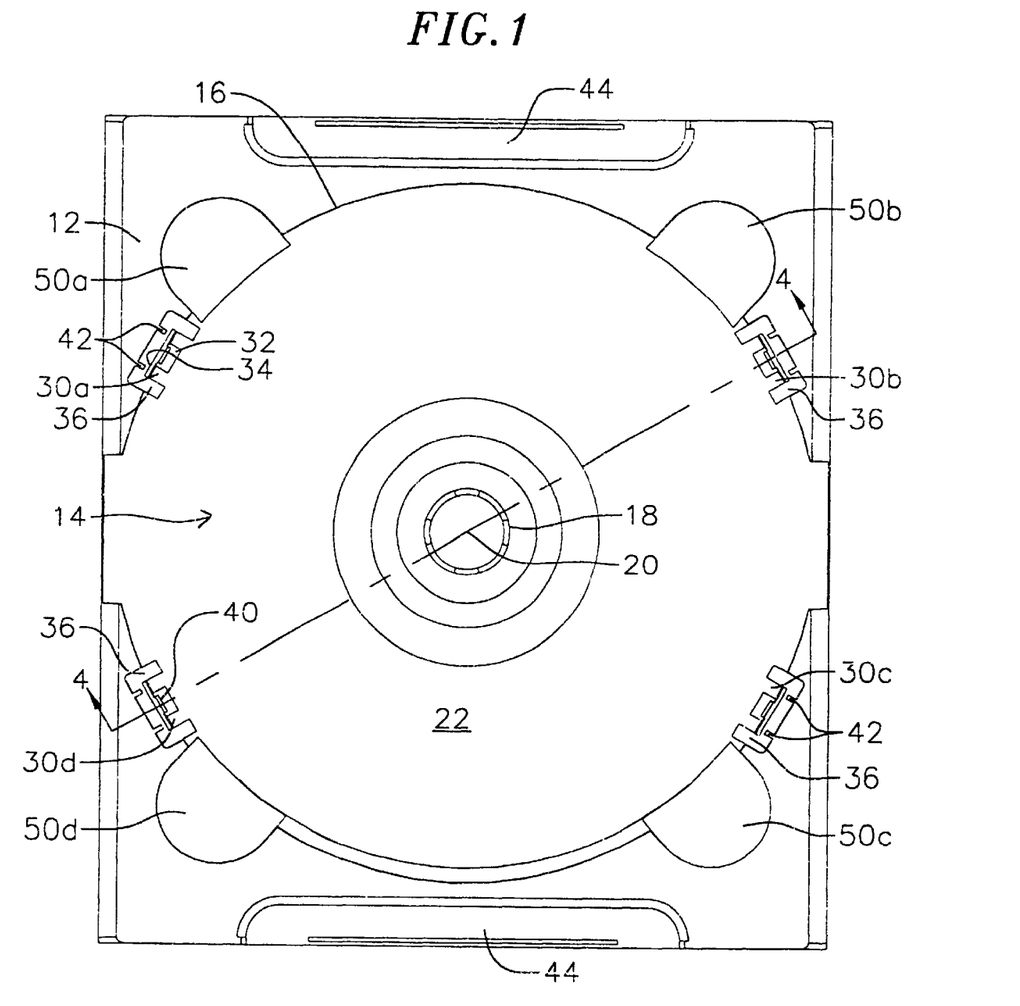
FIG. 1 is a plan view of an exemplary embodiment of the disc storage container of the present invention.

The disc storage area 14 is preferably formed as a depression in the tray 12, and the diameter of the crater is dimensioned to receive an optical disc therein. The depth of the disc storage area is equal to or greater than the thickness of the optical disc.

In a preferred embodiment of the present invention, the disc is secured in the disc storage area 14 by a plurality of holding members 30. Each holding member 30 has an arm 32 and a disc supporting wall 34 connected to the arm. The arm 32 is attached to the floor 22 of the disc storage area 14 and preferably lies in the same plane as the floor 22. The disc supporting wall 34 preferably extends upward from the arm 32 at a substantially perpendicular angle. Each holding member 30 is preferably located in an opening 36 in the tray 12 such that the only part of the holding member 30 that is attached to the tray 12 is the arm 32.

Figure 4:
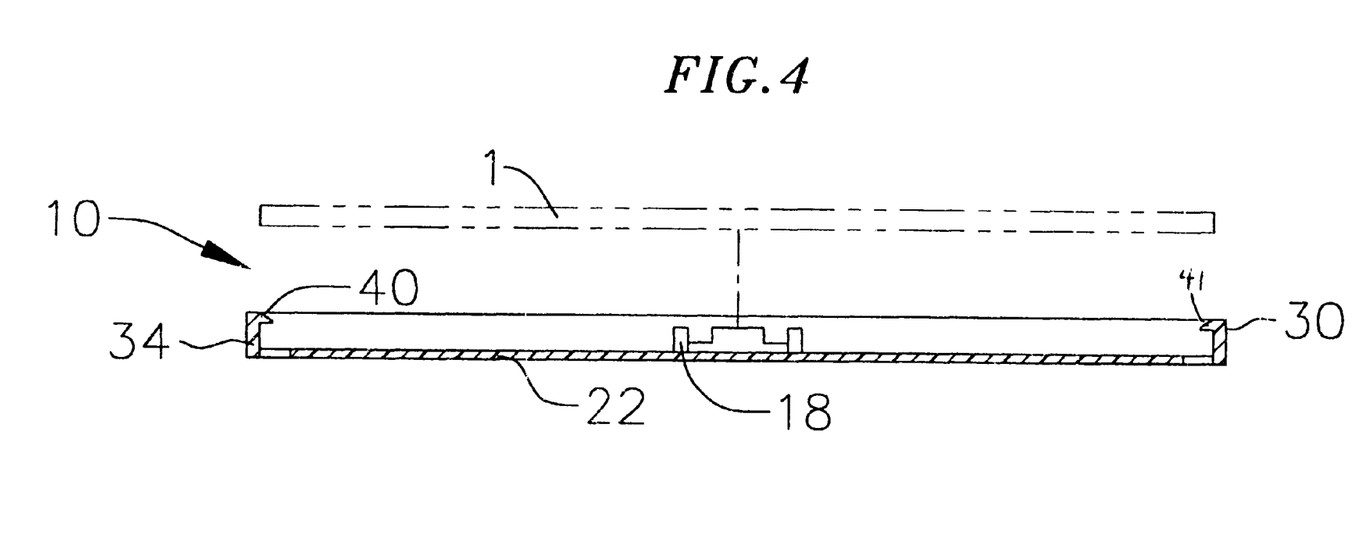
FIG. 4 is a side cross-sectional view of the disc storage container of FIG. 1 taken along line 4—4, showing a disc in phantom above the disc storage container, the center of the disc being aligned with the center of the disc storage container.
Figure 5:
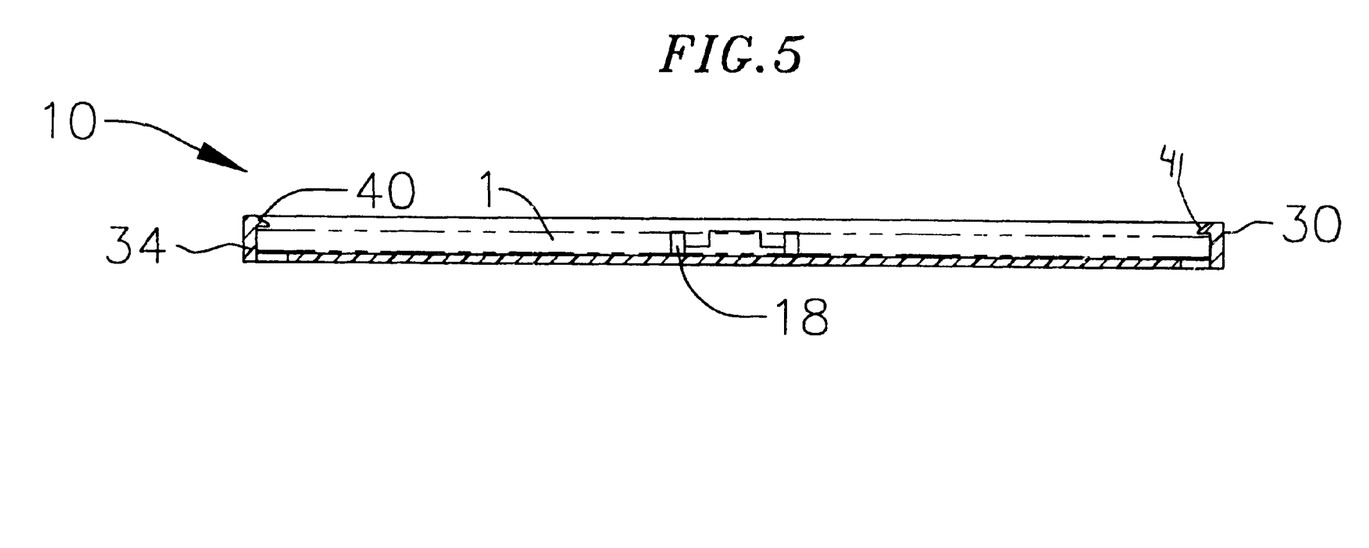
FIG. 5 is the view of the storage container of FIG. 4 showing the disc installed in the storage container and securely held by the holding member.

The holding members 30 preferably include a lip 40 for retaining the disc in the disc storage area 14. The lip 40 protrudes from the disc supporting wall 34 and inhibits the upward movement of a disc that has been placed in the disc storage area 14. As shown in FIGS. 4 and 5, the lip 40 preferably has an inclined upper surface 41 to facilitate the insertion of the disc therepast.

In the embodiment shown in FIGS. 1 and 2, the disc storage container 10 includes four holding members 30a, 30b, 30c, and 30d, respectively. The holding members 30a, 30b, 30c, and 30d are identical and referred to generally herein as 30. The holding members 30a–d are preferably positioned in the tray 12 such that the first 30a and third 30c holding members are diametrically opposed to each other and the second 30b and fourth 30d holding members are diametrically opposed to each other.

The distance between the first 30a and the second 30b holding members is preferably equal to the distance between the third 30c and the fourth 30d holding members. Similarly, the distance between the second 30b and the third 30c holding members is preferably equal to the distance between the first 30a and the fourth 30d holding members. The positioning of the holding members and the distance therebetween is selected to maximize the stability for holding the disc in the disc storage area.

In a preferred embodiment, the four holding members are not equidistant from each other. Rather, the distance between the first 30a and second 30b holding members is preferably greater than the distance between the second 30b and the third 30c holding members. More preferably, the first and second holding members are 120 degrees apart, while the second and third holding members are separated by 60 degrees.

To insert a disc 1 into the disc storage area 14, the disc is positioned above the disc storage container 10, as shown in FIG. 4, such that the center of the disc is aligned with the centering post 18 of the disc storage container 10. As the disc 1 is urged downward, the periphery of the disc contacts the top surface of the lips 40 of the holding members 30a–d, causing the holding members 30 to extend or bend outwardly away from the center 20 of the disc storage area 14. As the disc is being moved downwardly toward the floor 22, its periphery moves past the lips 40 whereupon the holding members 30 snap or bend back to their original positions so as to capture the disc 1, at the unrecorded periphery thereof, as best shown in FIG. 5. The design of the holding members 30, namely, the inclined upper surface 41, is structured to ensure that the holding members 30 bend outwards as the disc is installed in the disc storage container 10. Unlike prior art devices, the holding members 30 of the present invention will not bend inward and will not interfere with the installation of the disc into the disc storage area.

As shown in FIG. 3, the arm 32 of the holding member 30 is constructed such that it is sufficiently flexible and pliant so as allow the holding member 30 to bend outward when the disc is being installed in the disc storage area. Yet, the arm is sufficiently rigid to inhibit the movement of disc 1 once it is installed in the disc storage area. In one embodiment of the invention, arm 32 has a cut-out relief 38 therein to ensure flexibility of the holding member 30.

Referring to FIGS. 1 and 3, in a preferred embodiment of practice of the present invention, support tabs 42 are provided on the tray 12 projecting from the tray into the opening 36 toward the holding member 30. The support tabs 42 are positioned so as to limit the distance that the holding members 30 can bend outwardly. The limiting action of the tabs prevents the holding members 30 from moving or bending excessively outward to avoid mechanical failure of the arm 32. The support tabs 42 are preferably provided in each opening 36 to support each holding member 30.

As shown in FIGS. 1 and 2, in a preferred embodiment, the tray 12 includes recesses 50a, 50b, 50c and 50d to facilitate the removal of the disc 1 from the disc storage area 14. The recesses are identical and are generally referred to herein as 50. The recesses 50a–d are dimensioned to allow a portion of a finger, e.g., the tip, to reach under the disc 1, thereby allowing the disc to be grasped and popped out of the tray 12. Alternatively, a machine operated tool can be inserted into the recess 50 to facilitate the removal of the disc 1 from the disc storage area 14. In the preferred embodiment, the shape of the recess is semi-circular.

Each recess 50 is preferably positioned adjacent an opening 36 containing a holding member 30 therein. The placement of the recess 50 in proximity to a holding member 30 facilitates the removal of the disc 1 from the disc storage area 14 by allowing the user to counteract the holding force exerted by the holding member 30. In the preferred embodiment, the first recess 50a is positioned diametrically opposed to the third recess 50c and the second recess 50d is positioned diametrically opposed to the fourth recess 50d. The recesses 50 are positioned near the holding members 30 so as to efficiently utilize the lifting force applied to the disc to counteract the holding force applied by the holding members 30.

Referring to FIGS. 1 and 2, the distance between the first 50a and the second 50b recesses is preferably equal to the distance between the third 50c and the fourth 50d recesses. Similarly, the distance between the second 50b and the third 50c recesses is preferably equal to the distance between the first 50a and the fourth 50d recesses. In a preferred embodiment, the four recesses are not equidistant from each other. Rather, the distance between the first 50a and second 50b recesses is preferably greater than the distance between the second 50b and the third 50c recesses.

The tray 12 of the disc storage container 10 is configured to be stackable with other trays. Accordingly, multiple disc storage containers can be stacked on top of each other to minimize the space needed for storing the containers. To facilitate the selection of one tray 12 from a stack of trays, each tray has a groove 44 on the side of the tray that is accessible when the tray is stacked with other trays.

Referring now to FIGS. 6 through 11, an alternative embodiment of a disc storage container 100 is provided in accordance with the present invention is shown. The storage container 100 comprises a cover or upper housing section 102 and a lower housing section 104. The upper housing section 102 is preferably attached to the lower housing section 104 via a hinge panel 106 which is attached to the upper housing section 102 via a first living hinge 108 and which is attached to the lower housing section 104 via second living hinge 110. Hinge panel 106 preferably includes a reinforcing rib 112 to enhance the structural strength thereof. The storage container 100 is preferably made of a polymer material which can provide a living hinge, such as polypropylene. Those skilled in the art will appreciate that various other means for attaching the upper housing section 102 to the lower housing section 104 are likewise suitable. For example, pivot hinges, such as those typically found in contemporary compact disc storage containers, are likewise suitable for attaching the upper housing section 102 to the lower housing section 104.

Figure 6:
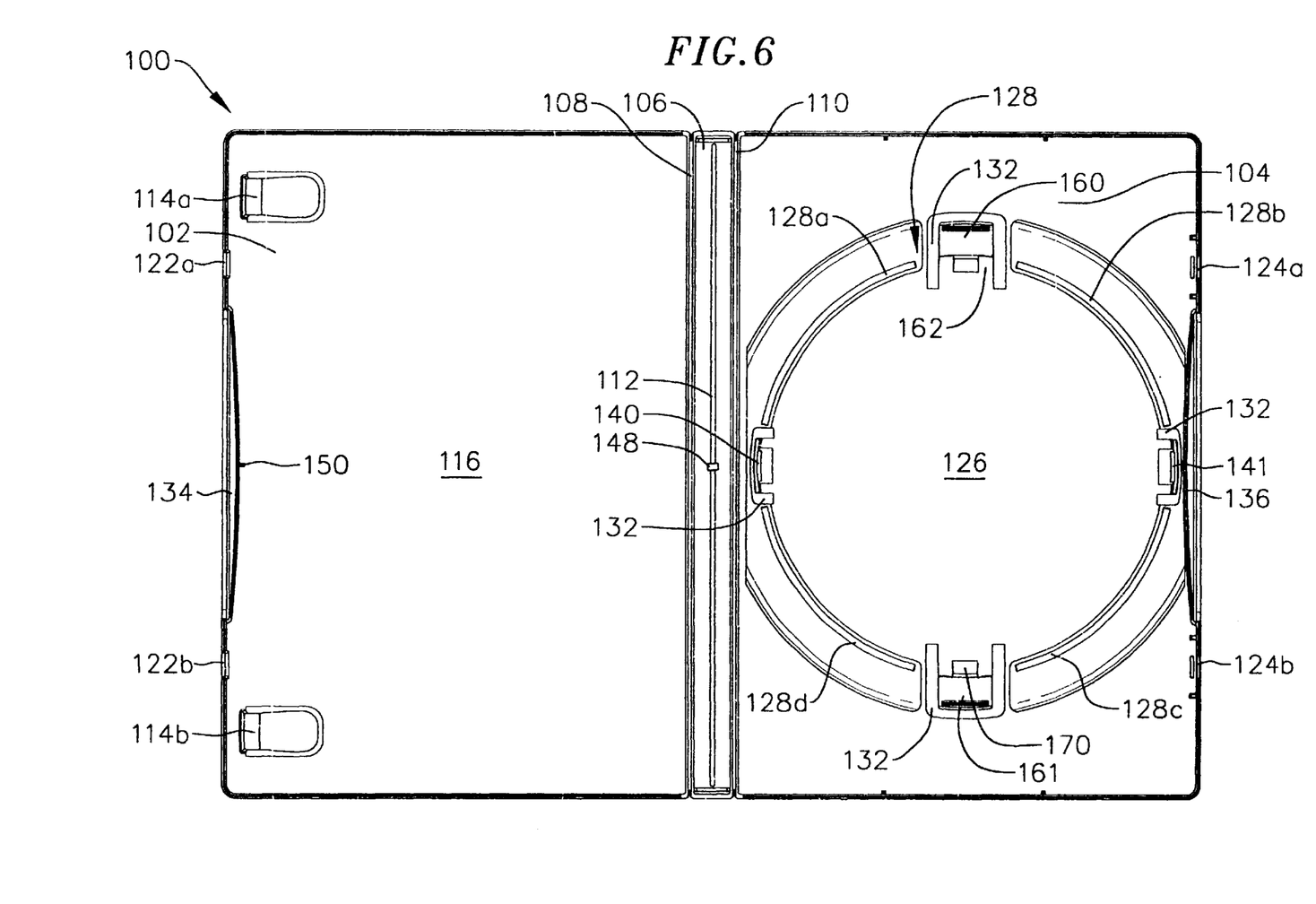
FIG. 6 is a plan view of another exemplary embodiment of the disc storage container of the present invention, shown in an open state.
Figure 7:
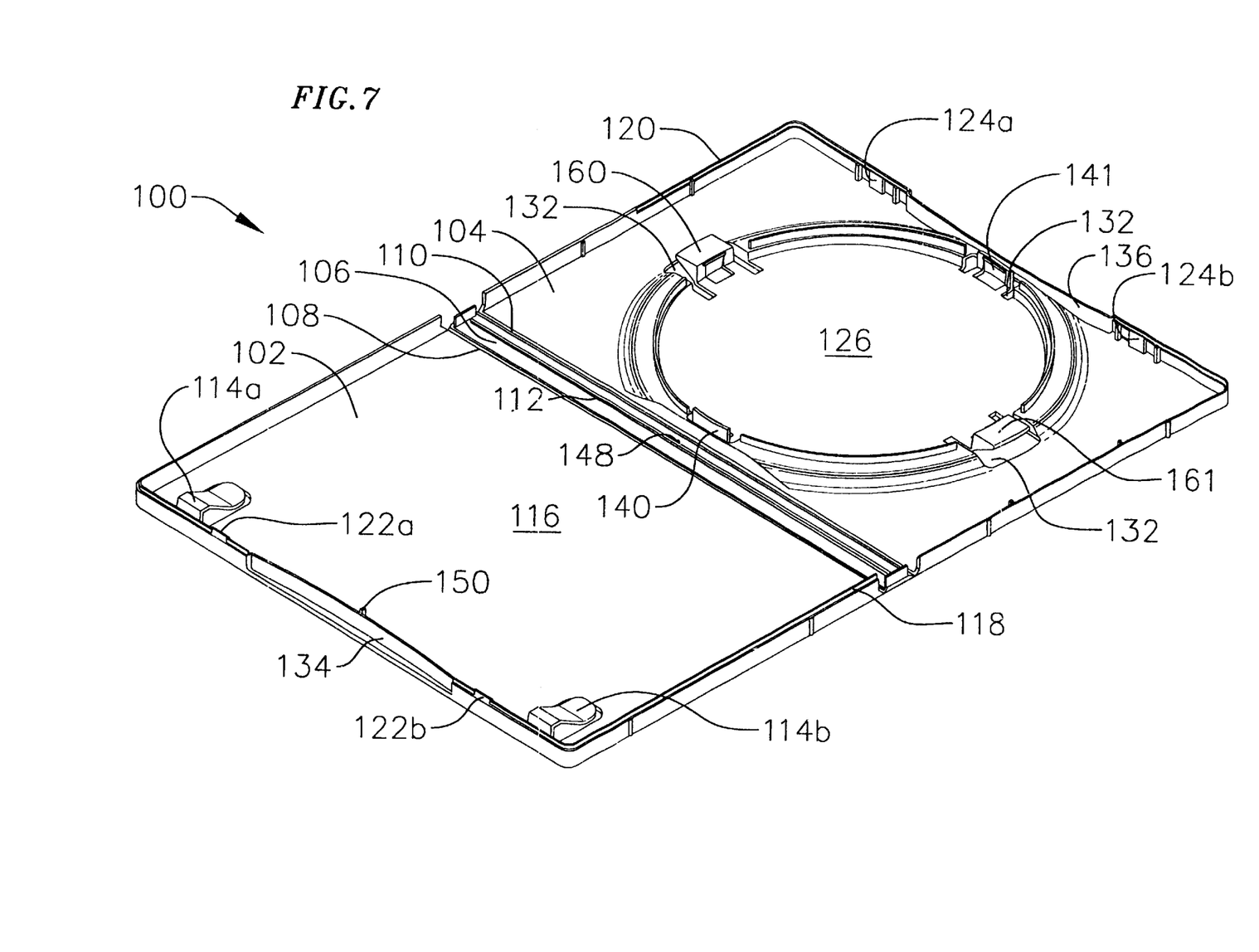
FIG. 7 is a perspective view of the disc storage container of FIG. 6.

First and second clips 114a and 114b, respectively, facilitate removable attachment of a cover, pamphlet, brochure, booklet or the like to the upper housing section 102. In one embodiment of the invention, the upper housing section 102 comprises a transparent window 116 such that either the cover or a front page of the pamphlet, brochure, booklet or the like may be viewed when the disc storage container is closed. When the cover is closed, the first 108 and second 110 living hinges are bent such that the upper housing section 102 is laminarly juxtaposed to and generally parallel with the lower housing section 104.

As best shown in FIG. 6 and 7, the upper housing section 102 and lower housing section 103 comprise an upper and lower housing flange 118 and 120. The upper housing flange 118 and lower housing flange 120 cooperate when the disc storage container is closed to define side walls therefor. In one embodiment, the upper housing section 102 has an upper concave edge 134 that corresponds to a lower concave edge 136 on the lower housing section 104. When the disc storage container is in a closed configuration, the upper and lower concave edges 134, 136 form an indentation on the exterior of the case. The upper and lower concave edges facilitate the opening of the disc storage container by providing an indentation in the disc storage container 100 that can be manipulated by a user's fingers to open the container.

The disc storage container is preferably injection molded as an integrally formed unit, preferably of a substantially transparent or clear polymer material, such as polypropylene. Alternatively, the upper housing section may be formed separately from the lower housing section and then attached thereto during assembly via attachment means such as pivot hinges.

Upper housing latches 122a and 122b cooperate with lower housing latches 124a and 124b, respectively, to openably latch the disc storage container 100 in a closed configuration. Upper housing latches 122a and 122b preferably define detents which engage complimentary detents defined by lower housing latches 124a and 124b according to well-known principles.

Figure 8:
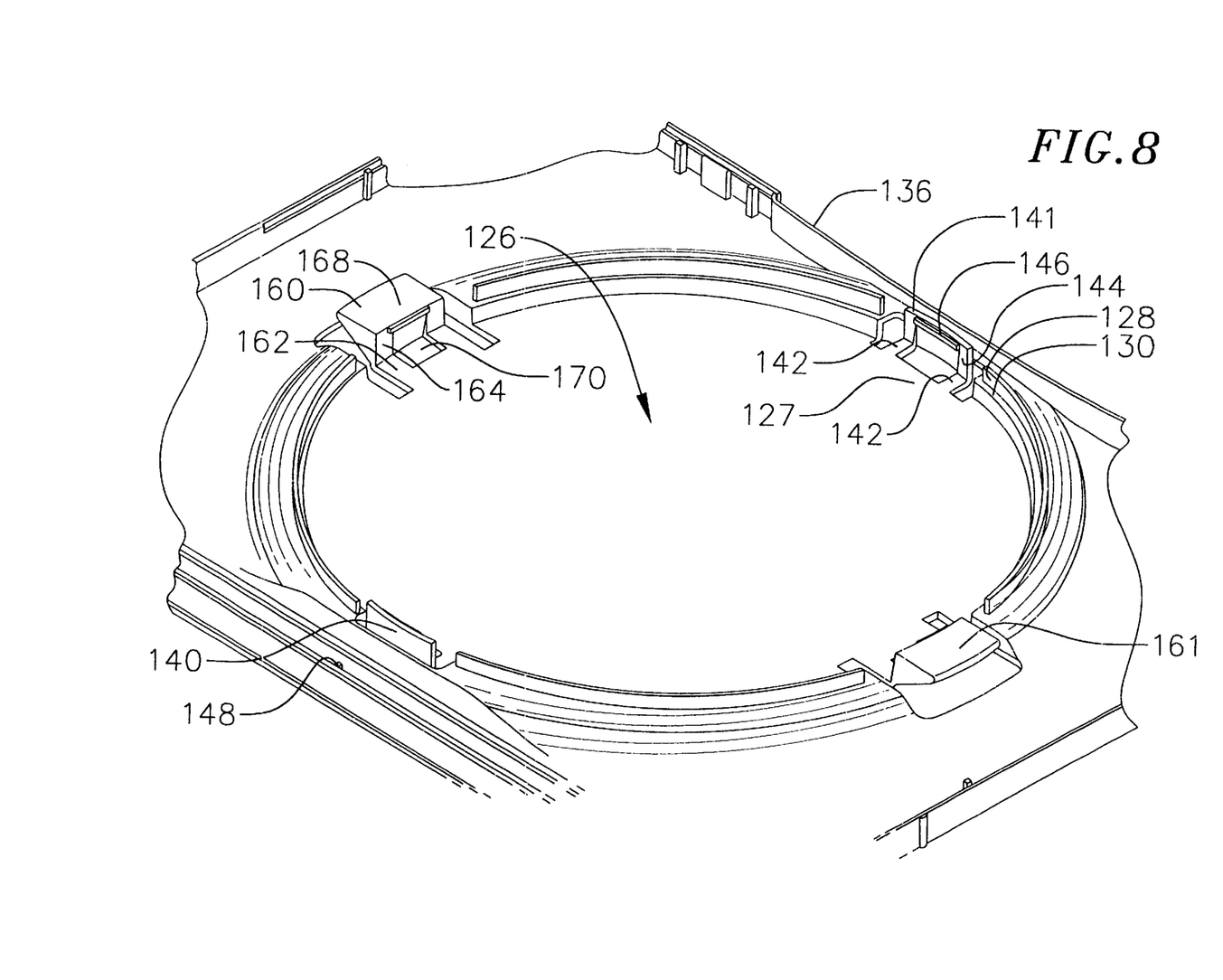
FIG. 8 is an enlarged fragmentary view of the release buttons and holding members of an exemplary embodiment of the disc storage container of the present invention.
Figure 9:
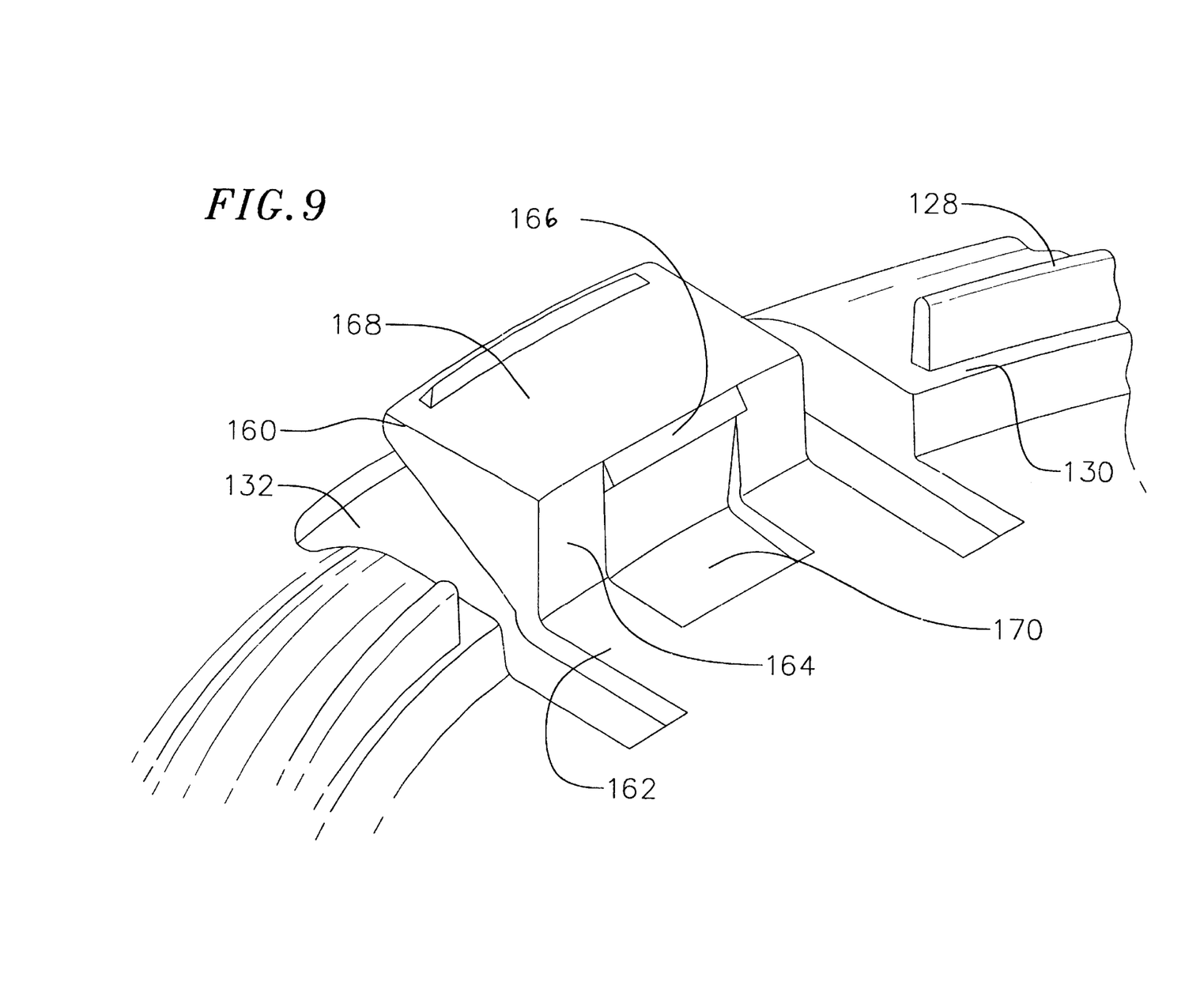
FIG. 9 is an enlarged fragmentary view of the release button of an exemplary embodiment of the disc storage container of the present invention.

Referring to FIGS. 8 and 9, in addition to FIGS. 6 and 7, the lower housing section comprises a disc storage area 126 which is surrounded and defined by a support ring 128. The support ring 128 preferably comprises a projecting portion (best seen in FIGS. 8 and 9), the upper surface of which is flattened so as to define a seat 130 for a disc. The seat 130 is configured so as to contact the disc about the unrecorded periphery thereof only.

The support ring 128 preferably comprises four partial quadrants 128a, 128b, 128c and 128d, each partial quadrant physically separated from the other partial quadrants by a hole 132 in the disc storage container 100. The quadrants 128a–d collectively define the disc storage area 126.

In a preferred embodiment of a container in accordance with the present invention, a disc is secured in the disc storage area 126 by a pair of holding members 140, 141 and a pair of release buttons 160, 161. Each holding member 140, 141 is disposed in a respective hole or opening 132 and more preferably, the pair of holding members 140, 141 are disposed in respective holes or openings 132 diametrically opposed to each other. In a preferred embodiment, as best shown in FIG. 8, each holding member 140, 141 comprises a pair of radially extending, spaced apart arms 142 and a disc supporting wall 144. The holding member is attached to the floor 127 of the disc storage area 126 by the pair of extending arms 142. The disc supporting wall 144 extends laterally from the pair of extending arms and is structurally supported thereby.

The disc supporting wall 144 comprises a retaining lip 146. The retaining lip 146 is dimensioned to maintain a disc in the disc storage area 126 by limiting the upward movement of the disc disposed upon the seat 130. In the preferred embodiment, the retaining lip 146 is a flat ledge that is perpendicularly connected to the disc supporting wall 144. The composition and dimensions of the extending arms 142 are selected so as to provide a flexible, pliant holding member 140 that bends in order to facilitate the insertion and removal of a disc from the disc storage area 126. Yet the holding member 140, 141 must remain sufficiently rigid to retain a disc in the disc storage area 126 when the disc is stored therein.

In a preferred embodiment of the invention, the disc is also retained in the disc storage area 126 by a pair of release buttons 160, 161. Each release button 160, 161 is disposed in a respective hole 132 and more preferably, the pair of release buttons 160, 161 are disposed in respective holes 132 diametrically opposed to each other. In the preferred embodiment, as best shown in FIGS. 8 and 9, each release button 160, 161 comprises a base 162 and a disc supporting wall 164. The base 162 of the release button is preferably attached to the floor 127 of the disc storage area 126. The disc supporting wall 164 extends laterally from the base 162 and is structurally supported thereby.

Turning particularly to FIGS. 6 and 7, in a preferred embodiment, the reinforcing rib 112 has a raised portion 148 thereon. One of the holding members 140 is positioned such that when the disc storage container 100 is in a closed configuration, the raised portion 148 bears against the back surface of the disc supporting wall 144 of the associated holding member 140. The raised portion 148 exerts force on the holding member 140 to keep the disc supporting wall 144 pressed toward the center of the disc storage area 126, thus securely retaining a disc placed in the disc storage area. Similarly, the upper concave edge 132 of the upper housing section 102 includes a projecting portion 150 thereon. A second holding member 141 is positioned such that when the disc storage container 100 is in a closed configuration, the raised portion 150 of the upper concave edge 132, bears against the disc supporting wall 144 of the holding member 141. When both holding members 140, 141 are pressed toward the center of the disc storage area 126, a disc placed between the holding members 140, 141 is securely held in place. Accordingly, the raised portions 148 and 150 work together to hold the opposed holding members closed, in order to secure the disc between the holding members. This feature, together with the release buttons 160, 161, is particularly helpful in keeping the disc between the holding members in the event that the storage container is accidentally dropped.

Referring to FIG. 9, the disc supporting wall 164 comprises a retaining lip 166. The retaining lip 166 is dimensioned to maintain a disc in the disc storage area 126 by limiting the upward movement of the disc disposed upon the seat 130. In the preferred embodiment, the retaining lip 166 is a flat ledge that is perpendicularly connected to the disc supporting wall 164. In another embodiment of the invention, the retaining lip 166 has an inclined upper surface to facilitate the insertion of the disc therepast into the disc storage area 126. The release button preferably has a flat upper surface 168 extending laterally form the disc supporting wall 164. The upper surface 168 is dimensioned so as to bend the release button 160, 161 outward when it is depressed by a finger or by an automated machine. The composition and dimensions of the base 162 are selected so as to provide a flexible, pliant release button 160, 161 that bends in order to facilitate the insertion and removal of a disc from the disc storage area 126. Yet the release button 160, 161 must remain sufficiently rigid to retain a disc in the disc storage area 126 when the disc is stored therein. In another embodiment of the present invention, the base 162 of the release button 160, 161 has a cut-out relief 170. The cut-out relief 170 in the base 162 ensures that release button is sufficiently flexible and pliant so as to bend and facilitate the insertion and removal of a disc from a disc storage area 126.

Figure 10:
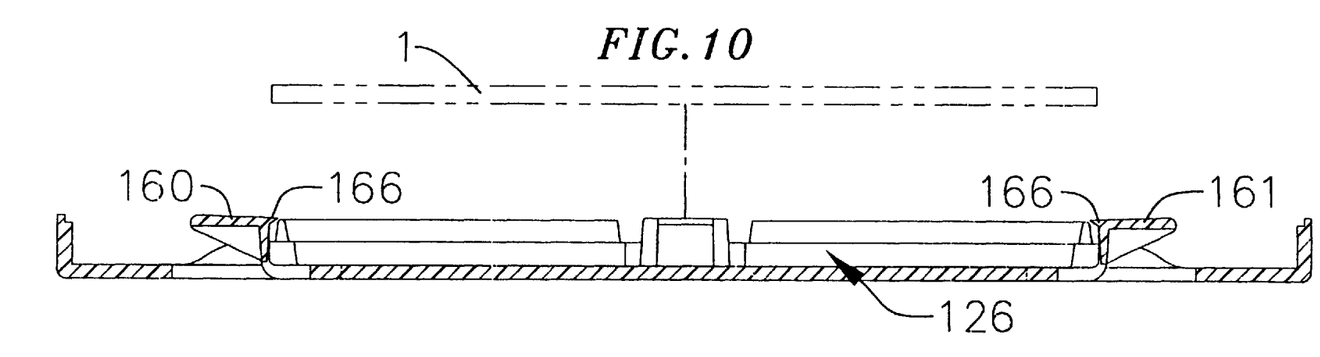
FIG. 10 a side cross-sectional view of the disc storage container of FIG. 6 taken along line 10—10, showing a disc in phantom above the disc storage container.
Figure 11:
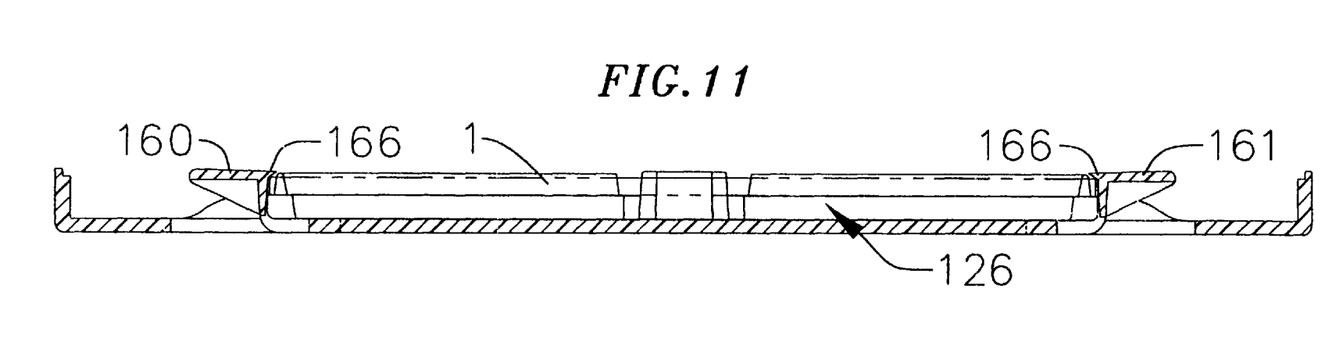
FIG. 11 is the view of the storage container of FIG. 10 showing the disc installed in the storage container and securely held by the release buttons.
Figure 12:
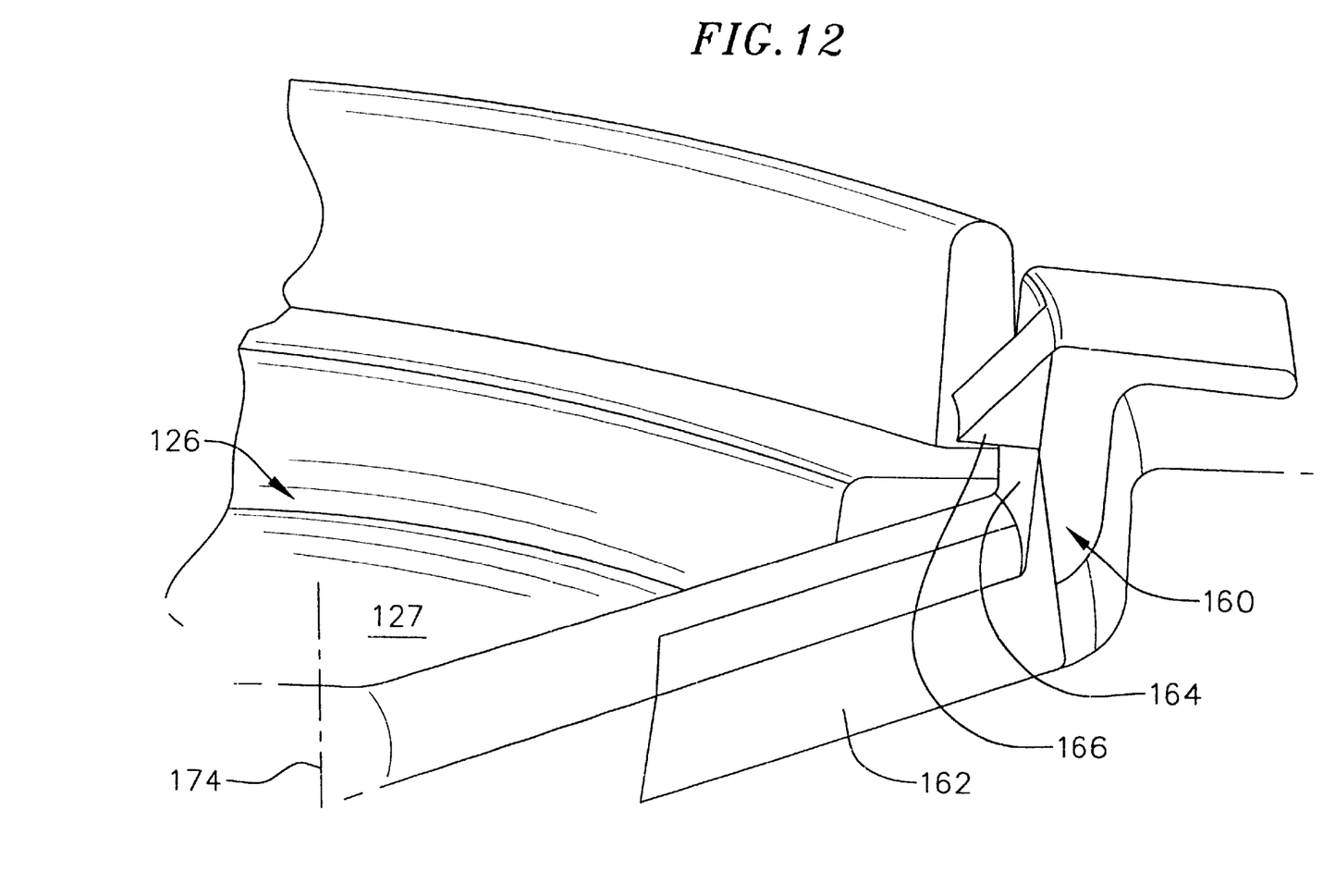
FIG. 12 is a side view of a release button of another exemplary embodiment of the present invention wherein the arm of the release button is attached to base of the disc storage container at an inclined angle.

In one embodiment of the present invention, as shown in FIGS. 6 through 11, the base 162 extends outwardly from the floor 127 of the disc storage area 126, in the same plane as the disc storage area. In another embodiment, as shown in FIG. 12, the base 162 is attached to the floor 127 at an angle 172. In the angled embodiment, the base 162 of each of the release buttons 160, 161 extends from the floor 127 of the disc storage area 126 at an angle 172. The base 162 of each of the release buttons 160, 161 extends from a hinge point 174, wherein the distance between the hinge point and the support ring is less than the distance between the hinge point and a center of the disc storage area. Providing the release button at an angle in relation to the floor 127 of the disc storage area 126 facilitates the release button to be depressed sufficiently to effect removal of the disc, even when the disc container is laid upon a flat surface, such as a table top.

The holding members 140, 141 are preferably disposed in holes 132 in the lower housing section 104 so as to facilitate injection molding of the lower housing section 104. Similarly, release buttons 160, 161 are disposed in holes 132 in the lower housing section 104 to facilitate injection molding. Forming the holding members 140, 141 and release buttons 160, 161 in holes 132 also facilitates fabrication of the lower housing section 104 via vacuum forming, if desired.

Thus, according to the present invention, a disc storage container is provided which facilitates easy insertion and removal of a disc by a user in a manner which does not result in the application of substantial stresses to the disc. This is particularly important for multi-layered discs which may become delaminated due to the repeated application of such undesirable stresses thereto during the removal of such discs from contemporary storage containers. As discussed above, the removal of the disc from a contemporary storage container typically results in undesirable bending of the disc in a manner which may cause such delamination.

To store a disc in the disc storage container of the present invention, the user depresses the release buttons 160, 161 simultaneously and inserts the disc into the disc storage area from above. The depression of the release buttons 160, 161 causes the buttons to extend outward allowing the disc access to the seat 130 and the disc storage area 126. During insertion of the disc, the force of the disc on the retaining lip 146 of the holding members 140, 141 causes the holding members to bend outward, allowing the disc to be seated on seat 130. Once the disc is seated, the holding members 140, 141 return to the neutral position wherein the retaining lips 146 of the holding members 140, 141 capture the disc and limit the upward movement of the disc seated in the disc storage area 126. Only the unrecorded periphery of the disc contacts the retaining lip 144 of the holding members 140, 141 as the disc is forced downwardly therepast.

After the holding member 140, 141 have snapped or bent back to the neutral position, the release buttons 160, 161 are released allowing the release buttons to return to a neutral position, as well. In the neutral position, the retaining lip 146 of the release buttons 160, 161 limit the upward movement of the disc seated in the disc storage area. FIG. 10 shows a disc 1 in position to be installed in the disc storage area 126 of the present invention. FIG. 11 shows the disc 1 installed in the disc storage area 126, and held in place by the retaining lips 164 of the release buttons 160 and 161. The combination of the holding members 140, 141 and the release buttons 160, 161 ensure that the disc is centered in the disc storage area and securely held in place.

To release the disc, the release buttons 160, 161 are depressed, causing the disc supporting walls 164 to move away from the disc, thus releasing the disc. The depression of one of the buttons 160, 161 is sufficient to release the disc. This feature is advantageous in that the disc storage container can be operated by either a right-handed or left-handed person. Thus, an individual can place his thumb on one of the release buttons 160, 161 and his index finger in the center hole of the disc and pull the disc easily form the case in that manner. The center hole of the disc can easily be accessed by the index finger of a user since there is no centering post to block the access to the center hole of the disc.

It is important to note that as the release buttons are depressed during removal of the disc from the disc storage container of the present invention, the geometry of base 162 with respect to the lower housing section 104 causes the disc supporting wall 164 of the release buttons to move away from the disc without substantially frictionally engaging, e.g., scratching, scraping abrading, or otherwise undesirably contacting the disc.

An important advantage of all embodiments of the disc storage container of the present invention is that it facilitates automated, i.e., machine loading of a disc therein. The disc storage container may be machine loaded by, for example, using a vacuum gripper to pick up a disc and to push the disc downwardly into the disc storage area 126 thereby deforming the retaining lips 144 and 164 such that the disc snaps therepast. The inclined surface of the lips 144, 164 facilitates the outward movement of the arm of the holding members 140, 141 or the base 162 of the release buttons 160, 161. Thus, a disc can be inserted into the disc storage area from above, such as during packaging of the disc by the disc manufacturer or producer. The design of the inclined upper surface of the lips 144, 164 is structured to ensure that the holding members 140, 141 or release buttons 160, 161 bend outwards as the disc is installed in the disc storage container. Unlike prior art devices, the holding members 140, 141 or release buttons 160, 161 of the present invention will not bend inward and will not interfere with the installation of the disc into the disc storage area.

It is to be understood that the exemplary disc storage containers described herein and shown in the drawings represent only a presently preferred embodiments of the invention. Indeed, various modifications and additions may be made to such embodiment without departing from the spirit and scope of the invention. Thus, modifications and additions may be obvious to those skilled in the art and may be implemented to adapt the present invention for use in a variety of different applications.

What is claimed is:

1. A storage container for storing an optical disc, the storage container comprising:
    a lower housing section;
    a support ring disposed on the lower housing section, the support ring having four support ring portions that collectively define a disc storage area, each support ring portion separated from another support ring portion by a hole in the lower housing section;
    a pair of release buttons configured to move outwardly with respect to the disc storage area, each release button disposed in one of the holes in the lower housing section, the release button having a base attached to a floor of the disc storage area and a disc supporting wall laterally extending from the base, wherein the disc supporting wall includes a retaining lip for inhibiting the movement of the optical disc seated in the disc storage area, and wherein each release button further comprises an upper surface, the upper surface configured to be depressed to facilitate removal of the disc; and
    a first and second holding members, each holding member disposed in one of the holes in the lower housing section and having an arm attached to the floor of the disc storage area and a disc supporting wall laterally extending from the arm, wherein the disc supporting wall includes a retaining lip for inhibiting the movement of optical discs seated in the disc storage area.

2. A storage container in accordance with claim 1, wherein the support ring comprises a projecting portion having a flattened top surface that defines a seat for the optical disc.

3. A storage container in accordance with claim 1 wherein the support ring define a 360 degree circle, and wherein each hole which separates the support ring portion is spaced at a 90 degree angle from at least one the other hole.

4. A storage container in accordance with claim 3 wherein the release buttons are disposed in respective holes that are located diametrically opposed to each other.

5. A storage container in accordance with claim 4 wherein the holding members are disposed in respective holes that are located diametrically opposed to each other.

6. A storage container in accordance with claim 5 further comprising, an upper housing section and a hinge panel connecting the upper housing section to the lower housing section.

7. A storage container in accordance with claim 6 wherein the hinge panel comprises a raised portion thereon located so as to bear against the first holding member when the storage container is in a closed configuration.

8. A storage container in accordance with claim 7 further comprising an upper flange on the upper housing section that corresponds to and mates with a lower flange on the lower housing section when the storage container is in the closed configuration, the lower flange having a raised portion thereon located such that the raised portion of the lower flange bears against the second holding member when the storage container is in the closed configuration.

9. A storage container in accordance with claim 8 wherein the upper flange comprises an upper concave portion and the lower flange comprises a lower concave portion, wherein in the closed configuration, the upper and lower concave portions form an indentation to facilitate the opening of the storage container.

10. A storage container in accordance with claim 1 wherein the base of at least one of pair of release buttons has a relief cut-out therein.

11. A storage container in accordance with claim 1 wherein the arm of at least one of the first and second holding members has a relief cut-out therein.

12. The storage container in accordance with claim 1 wherein the base of each of the release buttons extends from the floor of the disc storage area at an angle.

13. The storage container in accordance with claim 12 wherein the base of each of the release buttons extends from a hinge point, wherein the distance between the hinge point and the support ring is less than the distance between the hinge point and a center of the disc storage area.

14. A disc storage container comprising a top cover, a base, a first edge adjacent a hinge, a second edge opposite the first edge, and a holding member, the base further comprises a substantially circular raised section that is bisected by the holding member, the raised section defines a recess and a disc storage area; and wherein at least one of the first edge and the second edge further comprises a raised portion which is configured to push against the holding member when the top cover is closed over the base.

15. The disc storage container of claim 14, further comprising a release button, said release button is configured to be pressed and when so pressed, moves outwardly with respect to the recess.

16. The disc storage container of claim 14, wherein the raised section further comprises a projecting portion, said projecting portion is configured to retain a disc perimeter.

* * * * *

UNITED STATES PATENT AND TRADEMARK OFFICE
CERTIFICATE OF CORRECTION

PATENT NO.     : 6,454,090 B1
DATED          : September 24, 2002
INVENTOR(S)    : Victorio T. Flores Jr., et al.

It is certified that error appears in the above-identified patent and that said Letters Patent is hereby corrected as shown below:

<u>Column 11,</u>
Line 23, replace "members" with -- member --
Line 35, replace "define" with -- defines --
Line 37, replace "one the other hole" with -- one of the other holes --
Line 45, after "comprising" delete the comma.

<u>Column 12,</u>
Line 19, replace "one of pair of" with -- one of the pair of --

Signed and Sealed this

Seventh Day of October, 2003

JAMES E. ROGAN
*Director of the United States Patent and Trademark Office*